United States Patent Office 3,102,153
Patented Aug. 27, 1963

3,102,153
SINTERING APPARATUS
Jürg Stieler and Dietrich Münch, Frankfurt am Main, Germany, assignors to Metallgesellschaft Aktiengesellschaft, Frankfurt am Main, Germany
Filed Sept. 24, 1962, Ser. No. 225,708
Claims priority, application Germany May 2, 1958
4 Claims. (Cl. 266—21)

This invention relates to means for moving sintering pans or pallets in a sintering apparatus from the upper tracks to the lower tracks, and then back to the upper tracks.

This application is a continuation-in-part of our copending application Serial No. 809,759, filed April 29, 1959, for "Sintering Apparatus," now abandoned.

The sinter pans or pallets in a sintering apparatus are moved on the upper or lower horizontal reaches of an endless track with the pans being in abutting and pushing relationship, adjacent pans not being fastened together. At the end of the upper and lower reaches, the pans are engaged by sprockets and guided by curved rails as the pans are being either lifted or lowered between the horizontal reaches of the tracks. As the pans are turned from a horizontal to a vertical position, or vice versa, they rub or scrape against one another, thus causing damage to the pans.

The object of this invention is to produce means for lifting and lowering the pans so that they will be held spaced from one another, especially at the points where one pan would slide forward and bang against a preceding pan with considerable violence, and thus cause damage.

The means by which the object of this invention is obtained are described more fully with reference to the accompanying drawings, in which.

Figure 1:
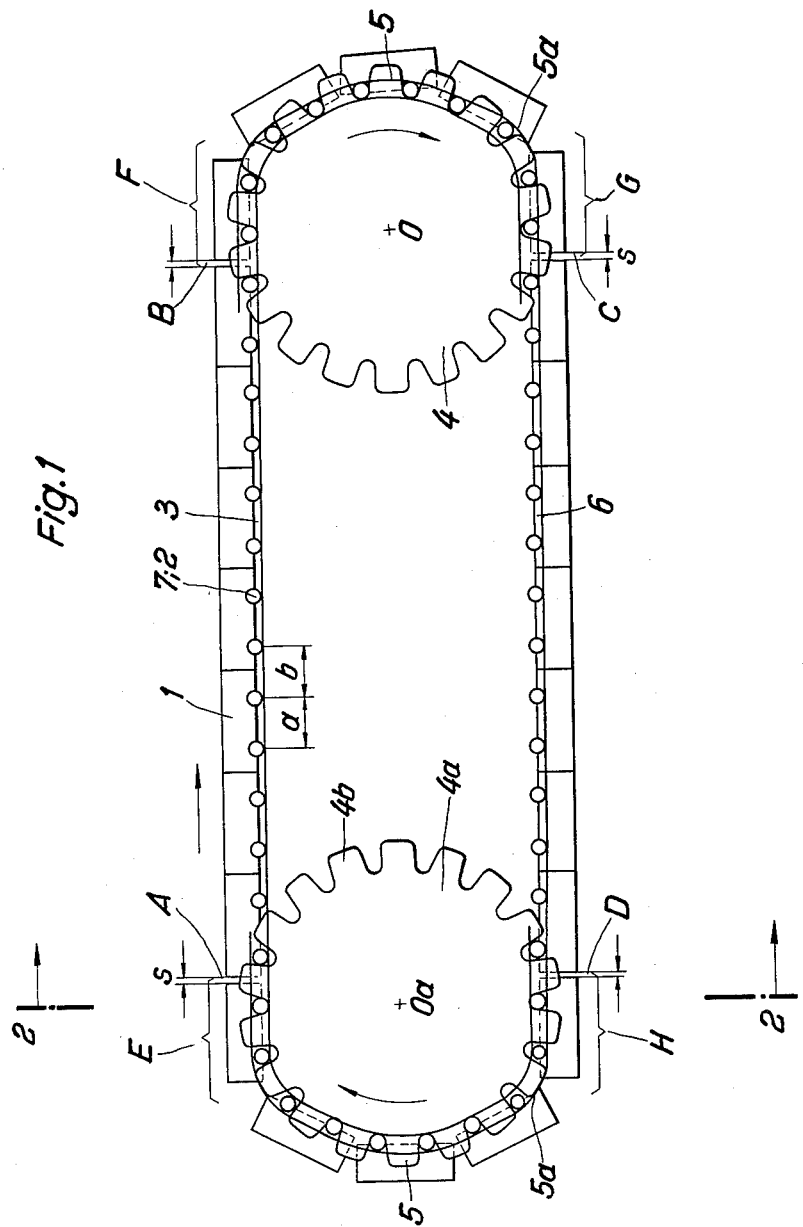
FIGURE 1 is a side elevational view of the pans mounted on the upper and lower track reaches of a sintering apparatus.
Figure 2:
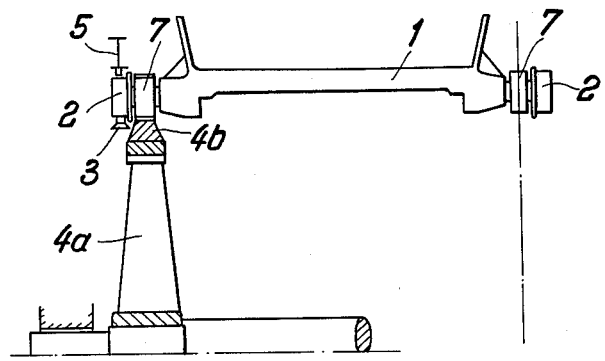
FIGURE 2 is a partial and enlarged cross-sectional view taken on the line 2—2 of FIGURE 1.

As shown in FIGURE 1, the individual sinter pans 1 are mounted on wheels 2 which ride on the upper reach 3 of a horizontal track, the pans then being lowered by and around a sprocket 4 with the wheels 2 being guided by curved rails 5 and 5a, whereupon the pans are inverted and placed on the lower reach 6 of the track. The pans then travel to the lifting sprocket 4a at the other end of the apparatus, whereupon the pans are lifted to the upper reach for advancement in the direction shown by the arrow. The lifting and lowering sprockets are each provided with teeth 4b for engaging thrust members on the pans to move the pans through the vertical distance between the upper and lower reaches of the track, as well as for subsequently pushing each pan in the horizontal track so that this pan pushes the whole line of pallets and advances the line toward the other sprocket. Although these teeth could engage the wheels 2 or the axles of the pans, they usually engage separate rolls 7, note FIGURE 2, mounted on the axles inasmuch as the rotation of the wheels 2 does not correspond with the movements of the flights of the sprocket teeth as the wheels ride along the curved guide rails 5 and 5a. These thrust members also exist in the form of fixed thrust bars projecting from the sides of the frames of the pans. In that case, a special flange construction is advantageous.

In some prior art constructions, the pans 1 are somewhat automatically separated from each other either in the regions of entry to and exit from the sprockets, which regions are designated as E and F in FIGURE 1 or during their travel around the sprockets, i.e. within the stretches from region H to region E or from region F to region G. However, according to prior art practices, this separation could not be achieved and maintained over the entire stretch from point D to point A, and from point B to point C, whereby the points A and D are situated to the right of the center $O_a$ of sprocket 4a and the points B and C to the left of the center O of sprocket 4.

Figure 3:
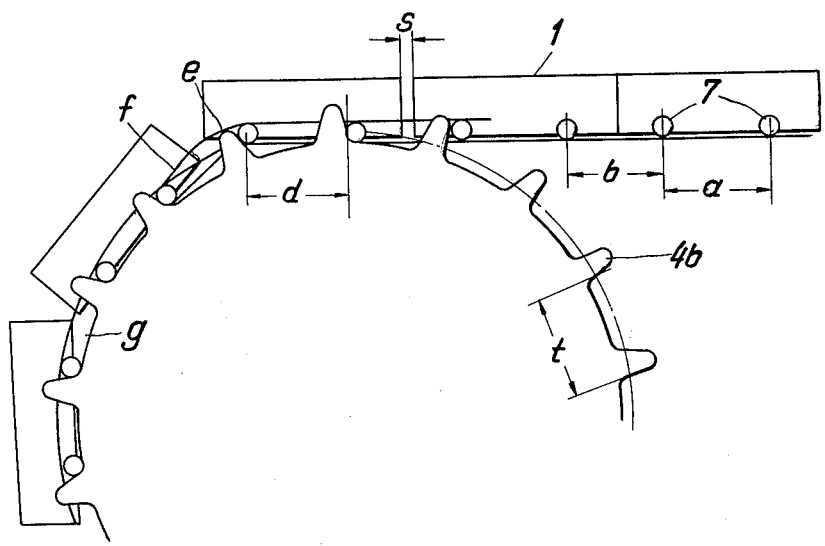
FIGURE 3 is a side view of a sprocket engaging a sinter pan according to this invention.
Figure 4:
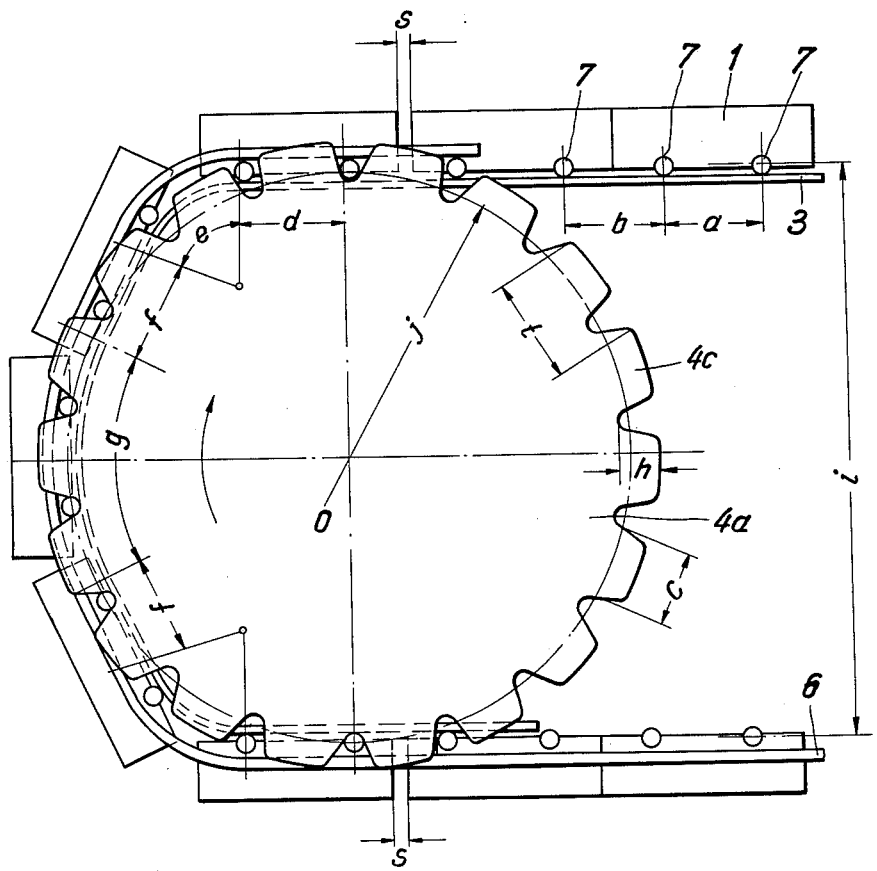
FIGURE 4 is a view similar to FIGURE 3 of a modified form of the invention.

According to this invention, as shown in FIGURES 1, 3 and 4, it is ensured that a space or gap $s$ is always maintained between the pans on the horizontal reaches of the tracks at the points A, B, C and D before the pans are at the point of transition from horizontal to vertical travel, or vice versa. This space between the pans is maintained during the vertical travel of the pans on the curved guide rails 5 and 5a and until after each pan has assumed a horizontal position on its respective upper or lower reach of the track, and before the pan contacts a preceding pan. It has been discovered that at least three of the following features must be combined in order to ensure the maintaining of a space or gap between adjacent pans during their vertical transit and while being initially horizontally pushed on the reaches:

(1) The distance $a$ between the two thrust members 7 provided for each pan;
(2) The distance $b$ between the immediately adjacent thrust members of two abutting pans, this being the closest distance between the thrust members of adjacent pans;
(3) The circular pitch $t$ of the teeth in each lifting or lowing sprocket;
(4) The distance $c$ between the operative flanks of one tooth engaging the thrust member 7;
(5) The distance $d$ by which the straight portion of the upper and lower horizontal reaches of the tracks extends outwardly beyond the vertical center line of each sprocket.

In FIGURE 3, features 1 to 3, supra, are combined. The distance $a$ between the pair of thrust members on each pan is equal to the circular pitch $t$ of the sprocket teeth of the lifting sprocket, whereas the distance $b$ between the closest thrust members of adjacent pans is less than the distance $a$ by an amount $s$ which is the gap to be created between adjacent pans on the horizontal track reach and to be maintained between the pans as the pans are in transit between the upper and lower reaches. Thus, FIGURE 1, as the pans are pushed from the lower reach into engagement with the lifting sprocket at the point D, they will be separated by a distance $s$ so that they will not abut until after they have assumed a horizontal position just beyond the point A, at which point they are beginning to leave the lifting sprocket.

The straight horizontal and outward extension $d$ from the vertical center line of the sprocket has a distance at least equal to the distance $a$. This extension $d$ ensures that the teeth of the lifting sprocket remain in constant engagement with the thrust members beyond the point that lies above the vertical center line of the lifting sprocket without making it necessary to use teeth that are so large as to become technically impractical. For the lifting sprocket, the teeth remain engaged with a preceding pan to push it forwardly until a trailing pan has reached a fully horizontal position and separated from the preceding pan by the distance $s$ before contact can be made between the pans. In the lowering sprocket, the teeth are engaged with the preceding pan before it leaves the horizontal reach so as to keep the pan spaced from both a preceding pan and a trailing pan.

The curved guide rails 5 and 5a are connected to the horizontal reaches by means of a short curved portion e which has a considerably less radius than that of either the lifting or lowering sprocket. Curved portion e is conveniently connected by a straight piece of rail f to a circular rail portion g at a point lying above the horizontal plane through the center point O of either sprocket.

As more fully shown in FIGURE 4, in each form of the invention, especially shaped teeth 4c can be used in which the addendum h of each tooth is about ten times greater than the desired gap distance s, which latter distance is preferably about 20 mm. By reason of the straight extensions d of the upper and lower reaches, the depth of the teeth can thus be about 200 mm. which gives a practical construction, whereas prior art constructions would require an impractical tooth depth of 500 mm. or more for producing an equivalent result. The addendum h is independent of the size of the sprocket as the required gap distance s for safety purposes does not depend upon the size of the apparatus.

By so designing the depth of the teeth, the flanks of the teeth are spaced so that the vertical component of pressure against the thrust members 7 is very small, that is less than the weight of the pan as the pan leaves the curved guide rails 5 and 5a and re-enters either the upper or lower reaches of the tracks. A distance s of about 20 mm. has proved to be adequate for preventing contact between the pans even after the teeth have been worn following lengthy use in service.

A separation of the sintering pans according to this invention can be applied to a sintering apparatus where the lowering sprocket is mounted for horizontal or pendulum movement to compensate for changes in pan lengths due to thermal expansion, and as disclosed in our copending application Serial No. 793,560, filed February 16, 1959, for "Sintering Apparatus," now abandoned. According to the instant invention, a special feature exists in that the pitch diameter t of the lowering sprocket permits the centers of the thrust members to ride on or off the lowering sprockets substantially tangentially to the circular pitch of the sprockets. In so doing, the vertical distance i between the axis of the thrust members of the pans on the upper and lower reaches of the tracks is made practically equal to and preferably a little larger, i.e. 5–10 mm. larger than the pitch diameter j of the sprocket as measured at the point of the horizontal entry of a pan onto the lower sprocket.

Having now described the means by which the objects of the invention are obtained, we claim:

1. In a sintering apparatus having tracks forming upper and lower reaches between spaced sprockets, pans movable on said tracks in pushing and abutting relationship, and teeth on said sprockets for engaging at least two spaced thrust members on each pan for moving said pans between the upper and lower reaches of the tracks, the improvement comprising a straight horizontal extension of each track reach outwardly beyond the vertical center line of each sprocket for a distance equal to the distance between the thrust members on one pan, a first curved guide rail portion joined to each horizontal extension and having a radius less than that of its respective sprocket, and a second guide rail portion connected to said first guide rail portion at a point offset from the horizontal plane through the sprocket.

2. In a sintering apparatus as in claim 1, said first and second curved guide rail portions being connected by a straight guide rail portion.

3. In a sintering apparatus as in claim 1, further comprising teeth on each sprocket having a circular pitch greater than the distance between the immediately adjacent thrust members of two abutting pans for forming a gap between pans when engaged by said teeth.

4. In a sintering apparatus as in claim 3, said gap having a length about equal to the difference between said circular pitch and the distance between said immediately adjacent thrust members.

No references cited.